(12) United States Patent
Whitby-Strevens et al.

(10) Patent No.: US 9,544,069 B2
(45) Date of Patent: Jan. 10, 2017

(54) METHODS AND APPARATUS FOR LINK TRAINING, INITIALIZATION AND MANAGEMENT VIA A HIGH SPEED BUS INTERFACE

(71) Applicant: Apple Inc., Cupertino, CA (US)

(72) Inventors: Colin Whitby-Strevens, Ben Lomond, CA (US); Brijesh Tripathy, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/550,698

(22) Filed: Nov. 21, 2014

(65) Prior Publication Data
US 2016/0149654 A1    May 26, 2016

(51) Int. Cl.
| | |
|---|---|
| H04B 11/00 | (2006.01) |
| H04B 17/21 | (2015.01) |
| H04B 17/00 | (2015.01) |
| H04W 52/02 | (2009.01) |
| H04W 24/06 | (2009.01) |
| H04B 1/40 | (2015.01) |
| H04W 24/08 | (2009.01) |

(52) U.S. Cl.
CPC .......... *H04B 17/21* (2015.01); *H04B 17/0085* (2013.01); *G09G 2370/10* (2013.01); *H04B 1/40* (2013.01); *H04W 24/06* (2013.01); *H04W 24/08* (2013.01); *H04W 52/0212* (2013.01)

(58) Field of Classification Search
CPC .. H04W 52/0212; H04W 24/06; H04W 24/08; G09G 2370/10; H04B 1/40
See application file for complete search history.

(56) References Cited

U.S. PATENT DOCUMENTS

| | | | |
|---|---|---|---|
| 6,693,895 B1 | 2/2004 | Crummey et al. | |
| 7,853,731 B1* | 12/2010 | Zeng | G09G 5/006 |
| | | | 710/17 |
| 8,848,809 B2 | 9/2014 | Whitby-Strevens | |
| 2007/0201492 A1 | 8/2007 | Kobayashi | |
| 2007/0286246 A1* | 12/2007 | Kobayashi | G06F 3/14 |
| | | | 370/522 |
| 2008/0231711 A1* | 9/2008 | Glen | G09G 3/2096 |
| | | | 348/192 |

(Continued)

OTHER PUBLICATIONS

VESA Display Port Link Layer Compliance Test Standard—Version 1.0, Sep. 14, 2007.

(Continued)

*Primary Examiner* — Ross Varndell
(74) *Attorney, Agent, or Firm* — Gazdzinski & Associates, PC (57) ABSTRACT

Apparatus and methods for training, initializing, and managing a unidirectional, sink-driven A/V interface of a consumer electronics device. Since camera sensors do not have significant processing capability, the disclosed embodiments couple the camera sensors to a simplified source node as a camera assembly. In the described embodiments, an intelligent receiver (e.g., a master "sink" node) trains, initializes, and manages one or more relatively low complexity camera sensor modules. Various other refinements and simplifications include: (i) where link training is managed by the receiver of the link, not by the transmitter, and (ii) where training multiple links in the network is managed by a single receiver.

20 Claims, 5 Drawing Sheets

(56) References Cited

U.S. PATENT DOCUMENTS

| | | |
|---|---|---|
| 2008/0301148 A1 | 12/2008 | Lee et al. |
| 2009/0024924 A1 | 1/2009 | Kim |
| 2011/0242425 A1 | 10/2011 | Zeng |
| 2011/0310296 A1 | 12/2011 | Lee et al. |
| 2012/0224640 A1 | 9/2012 | Sole et al. |
| 2013/0050216 A1* | 2/2013 | Whitby-Strevens .... G06F 13/14 345/428 |
| 2013/0162911 A1 | 6/2013 | Glen |
| 2014/0247983 A1 | 9/2014 | Macinnis et al. |
| 2015/0189109 A1 | 7/2015 | Whitby-Strevens et al. |
| 2015/0205749 A1 | 7/2015 | Whitby-Strevens et al. |

OTHER PUBLICATIONS

VESA Display Port Panel Connector Standard—Version 1.1, Jan. 4, 2008.
VESA Display Port PHY Compliance Test Standard—Version 1, Sep. 14, 2007.
VESA Display Port Standard—Version 1, Revision 1a, Jan. 11, 2008.
VESA "Mini Display Port" technology described in the Draft VESA Display Port Version 1.2 Standard, Dec. 22, 2009.

* cited by examiner

METHODS AND APPARATUS FOR LINK TRAINING, INITIALIZATION AND MANAGEMENT VIA A HIGH SPEED BUS INTERFACE

RELATED APPLICATIONS

This application is related to U.S. Provisional Patent Application Ser. No. 61/914,322 filed Dec. 10, 2013 and entitled "METHODS AND APPARATUS FOR VIRTUAL CHANNEL ALLOCATION VIA A HIGH SPEED BUS INTERFACE", U.S. Provisional Patent Application Ser. No. 61/914,312 filed on Dec. 10, 2013 and entitled "APPARATUS AND METHODS FOR PACKING AND TRANSPORTING RAW DATA", and U.S. patent application Ser. No. 13/274,225 filed on Oct. 14, 2011 and entitled "METHODS AND APPARATUS FOR LOW POWER AUDIO VISUAL INTERFACE CALIBRATION", the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The disclosure relates generally to the field of audio/visual (A/V) consumer electronics devices, as well as networks thereof. More particularly, in one exemplary aspect, the disclosure is directed to methods and apparatus adapted to train, initialize, and manage a unidirectional, sink-driven A/V interface.

2. Description of Related Technology

DisplayPort® is an exemplary and emerging digital display interface technology specified by the Video Electronics Standards Association (VESA). Current incarnations of the standard specify support for simple networking of digital audio/visual (A/V) interconnects, intended to be used primarily between an arbitrary assembly of multimedia "sources" (e.g., computers or CPUs) and "sinks" (e.g. display monitors, home-theater system, etc.). This interconnection is generally unidirectional in nature; i.e., from source to sink, in current implementations.

For reasons described in greater detail hereinafter, incipient research is directed to leveraging portions of DisplayPort technology for internal consumer electronics device operations (e.g., bus interfaces, etc.). Various implementation specific considerations require substantial modifications to the underlying DisplayPort control scheme. For example, certain internal components (e.g., camera modules) lack sufficient processing capabilities to comply with DisplayPort bus protocols including, but not limited to, link training, initialization, and management. Other aspects of the DisplayPort protocol may be "over-designed", or provide capabilities which are unnecessary.

Accordingly, improved methods and apparatus are needed to support internal consumer electronics device operations using DisplayPort technology (such as link training, initialization, and management). More generally, apparatus and methods are needed for calibrating and configuring internal components of a consumer electronics device.

SUMMARY

The present disclosure provides, inter alia, improved methods and apparatus adapted to train, initialize, and manage a unidirectional, sink-driven A/V interface.

In one aspect, a method for link initialization of a unidirectional interface of an electronic device is disclosed. In one embodiment, the method includes: discovering one or more nodes of a network; configuring a first node for link initialization by identifying a test pattern to transmit; configuring a second node for link initialization by identifying the test pattern to receive; causing the first and second nodes to perform a test characterized by the test pattern; and querying the second node for a status of the test.

In a first variant, the test pattern comprises clock-like content and the test is a clock recovery test. In a second variant, the test pattern comprises data-like content and the test is a symbol lock test. In a third variant, the unidirectional interface comprises a multi-lane interface, the test pattern comprises time varying content and the test is an interlane alignment test.

In one such exemplary variant, the first node comprises a source component and the second node comprises a sink component. In some cases, the source component is configured to generate video content. In some cases, the sink component is configured to aggregate multiple data streams.

In another exemplary variant, the one or more nodes of the network are slave nodes. In one such case, the network is enabled when each one of the one or more nodes have successfully completed link initialization.

In a second aspect of the present disclosure, an apparatus is disclosed. In one exemplary embodiment, the apparatus includes: a master sink node; one or more source nodes; and a non-transitory computer readable medium. In one exemplary embodiment, the non-transitory computer readable medium includes one or more instructions which when executed by the master sink node are configured to cause the master sink node to: discover the one or more source nodes; configure at least one source node to transmit a test pattern; and verify the transmitted test pattern.

In one variant, the transmitted test pattern is verified by at least one other sink node. In certain implementations, one or more instructions when executed by the master sink node are further configured to cause the master sink node to transmit another test pattern to the at least one other sink node.

In another variant, the transmitted test pattern is verified by the master sink node.

In some cases, the test pattern comprises clock-like content. In certain implementations, when the transmitted test pattern is unacceptable, the master sink node configures the at least one source node to change a voltage swing or pre-emphasis settings.

In other cases, the test pattern comprises data-like content and the verification of the transmitted test pattern comprises a Bit Error Rate (BER) measurement.

In a third aspect, a master sink node is disclosed. In one exemplary embodiment, the master sink node includes: a processor; and a non-transitory computer readable medium comprising one or more instructions which when executed by the processor are configured to cause the processor to: configure at least one source node to transmit a test pattern; configure at least one other sink node to receive the test pattern; and query the at least one other sink node for successful reception of the test pattern.

In one such variant, the at least one source node has less processing capability than the master sink node. In some such variants, the master sink node is a master of a control bus shared with the at least one source node and the at least one other sink node.

In a fourth aspect of the present disclosure, a non-transitory computer-readable storage apparatus is disclosed. In one embodiment, the storage apparatus includes a plurality of instructions that are configured to, when executed by a processor, cause a master sink node of an electronic device to: discover one or more other nodes of a network, the one or more other nodes comprising a source node and a concentrator node, the concentrator node being configured to aggregate data streams from multiple source nodes; set a first bandwidth requirement for the source node; set a second bandwidth requirement for the concentrator node; configure the source node for link initialization through the identification of a test pattern; configure the concentrator node for link initialization through the identification of the test pattern; cause the source and concentrator nodes to perform a test characterized by the test pattern; and receive a status of the test.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

All Figures© Copyright 2014 Apple Inc. All rights reserved.

DETAILED DESCRIPTION

Reference is now made to the drawings, wherein like numerals refer to like parts throughout.

As used herein, the term "DisplayPort" refers without limitation to apparatus and technology compliant with "VESA DisplayPort Standard"—Version 1, Revision 1a dated Jan. 11, 2008; "VESA DisplayPort Panel Connector Standard"—Version 1.1 dated Jan. 4, 2008; "VESA DisplayPort™ PHY Compliance Test Standard"—Version 1 dated Sep. 14, 2007; and/or "VESA DisplayPort™ Link Layer Compliance Test Standard"—Version 1.0, dated Sep. 14, 2007, as well as so-called "Mini DisplayPort" technology described in the Draft VESA DisplayPort Version 1.2 Standard, each of the foregoing being incorporated herein by reference in its entirety, and any subsequent revisions thereof.

Overview—

As a brief aside, the existing DisplayPort link training scheme is source-driven and requires significant link training intelligence in each source device; according to the aforementioned use scenario, this would require adding significant complexity to each camera assembly. Also, in DisplayPort, the source device (e.g., the DisplayPort transmitter) is assumed to be in overall control of the network, with the sink device (e.g., with the DisplayPort receiver) considered as being relatively 'unintelligent'. Unlike traditional DisplayPort technologies which are configured for source-driven networks, the present disclosure is directed to a sink-driven network.

Apparatus and methods for training, initializing, and managing a unidirectional, sink-driven A/V interface of a consumer electronics device are disclosed herein. In one exemplary embodiment, a consumer electronics device includes an application processor which controls one or more camera assemblies via the DisplayPort protocol. Since camera sensors do not have significant processing capability, the disclosed embodiments couple the camera sensors to a simplified source node as a camera assembly. The camera assembly is configured to pack camera sensor data in timeslots for transfer to the sink (e.g., the applications processor).

In one embodiment, the present disclosure contemplates methods and apparatus for training several DisplayPort connections. In the described embodiments, an intelligent receiver trains, initializes, and manages one or more relatively low complexity camera sensor modules. Unlike prior art DisplayPort interfaces which implement a DisplayPort AUX channel for control, in one embodiment, a single master/multislave I2C bus is used to communicate from the single sink device to all the other source devices in the network.

More generally, while existing A/V networks have used an intelligent source device to manage a network of devices (i.e., the "smart source" paradigm), the present disclosure describes a network of simplified nodes internal to a consumer electronic device that is managed by the sink node (i.e., "smart sink"). The sink node is an applications processor which runs the device operating system, applications, etc.

Various other refinements and simplifications include: (i) where link training is managed by the receiver of the link, not by the transmitter, and (ii) where training multiple links in the network is managed by a single receiver. Those of ordinary skill in the related arts will readily appreciate that the various aspects of the present disclosure are particularly well suited for applications where the sink (receiver) is the node that is best able to coordinate a complex network of sources (transmitters). These simplifications enable network management for processors with very modest capabilities. Yet other optimizations disclosed herein will be readily appreciated by those of ordinary skill in the related arts, given the contents of the present disclosure.

DETAILED DESCRIPTION OF EXEMPLARY EMBODIMENTS

Exemplary embodiments are now described in detail. While these embodiments are primarily discussed in the context of a camera system for a consumer electronics device, the general principles and advantages may be extended to other wireless or wired networks where a unidirectional network must be initialized by the receiver of data, the following therefore being merely exemplary in nature.

Exemplary Embodiment

DisplayPort Technology—

Extant DisplayPort technology is an extensible digital interface solution that is designed for a wide variety of performance requirements, and broadly supports PCs, monitors, panels, projectors, and high definition (HD) content applications. DisplayPort technology is capable of supporting both internal chip-to-chip, and external box-to-box digital display connections. Examples of internal chip-to-chip applications include notebook PCs which drive a display panel from a graphics controller, or display components from display controllers driving the monitor of a TV. Examples of box-to-box applications include display connections between PCs and monitors, and projectors (e.g., not housed within the same physical device).

The camera component inside most consumer electronics devices (e.g., iOS devices such as the iPad and iPhone devices manufactured by the Assignee hereof) is a simple image sensor and/or controller that does not have significant indigenous processing capabilities. Traditionally, camera data was streamed via a Mobile Industry Processor Interface (MIPI) to the application processor. Incipient research is directed to adapting DisplayPort technology for use with internal components (such as the aforementioned camera sensors that lack processing capability). DisplayPort technologies offer, inter alia, much higher bandwidths and other desirable features (e.g., multi-stream capability, etc.).

As a brief aside, DisplayPort provides unidirectional transmission of audio and video data from source nodes (where the content is generated from) to sink nodes (which consumes content), and an auxiliary channel (back-channel) for capability and status information to be sent from the sink to the source. Unlike typical bi-directional bus and network technologies, unidirectional device technologies (e.g. audio-visual systems such as DisplayPort, HDMI, DVI, etc.) have resisted bus or network arbitration, as the overhead imposed by such networking layers provides minimal benefit for direct source-to-sink type connections. The primary and auxiliary channels operate in "master/slave" mode under control of the master node. The master node controls both the low-level transmission of data between source and sink, and the higher level management of the display and networking.

Unfortunately, the exemplary DisplayPort technologies were designed for a "smart source" paradigm; i.e., the device providing the data performs bus management. In view of the capabilities of camera components (and other similarly limited components), DisplayPort and other "smart source" technologies must be adapted for use in a "smart sink" paradigm. Specifically, in smart sink applications, the slave source (e.g., a camera sensor) generates data/content for the master sink (e.g., the application processor).

Additionally, the full suite of DisplayPort capabilities may be unnecessary; other simplifications may further improve performance on controllers having very modest capabilities.

Methods—

Figure 1:
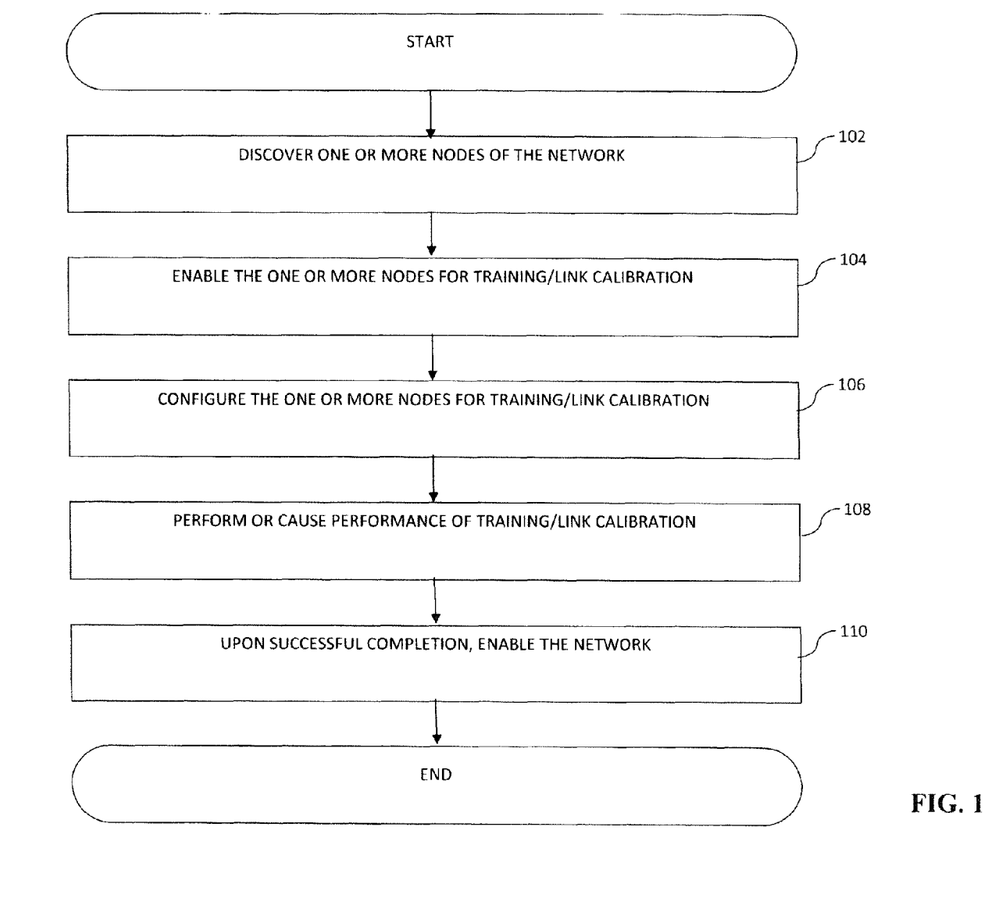
FIG. 1 is a logical flow diagram of one embodiment of a generalized method for training, initializing, and managing a unidirectional, sink-driven A/V interface, according to the disclosure.

FIG. 1 is a logical flow diagram of one embodiment of a generalized method 100 for training, initializing, and managing a unidirectional, sink-driven A/V interface.

At step 102 of the method 100, a master sink node discovers one or more nodes of the master sink node's network. As used herein, the term "node" refers without limitation to a logical endpoint and/or logical point of connection within a network (e.g., a network of interconnected nodes). As will be appreciated by those of ordinary skill given the contents of the present disclosure, the nodes may be arranged in a variety of different network topologies e.g., tree, ring, star, daisy chain, etc.

In one embodiment, network discovery may be based on a programmed or hardcoded configuration (as may be useful for fixed designs). In other embodiments, the sink node may perform network discovery via e.g., an out-of-band process, hot plug detect, etc. More generally, those of ordinary skill in the related arts will readily appreciate that network discovery and/or control signaling may be performed over low-speed and/or robust signaling paths. For example, in one exemplary embodiment initial network discovery and training initialization is performed via a low-speed control bus (e.g., via I2C bus, DisplayPort AUX channel, etc.). Yet other approaches will be recognized by those of ordinary skill given the present disclosure.

In simple embodiments (e.g., "star" networks), multiple source devices are each connected to the master sink device. In more complex embodiments (e.g., tree, daisy chain, ring, etc.), the network may include multiple sink nodes; in such cases, there may be a single master sink node, or alternatively the various sink nodes may be configured to dynamically determine which sink node should master the network. In some cases, the master sink node may be selected on the basis of the application (e.g., based on which node is to receive A/V content), power consumption and/or performance (e.g., where multiple sink nodes of the network have different power and performance capabilities), user selection, prioritization, etc.

Common examples of nodes include sensors (e.g., cameras, microphones, displays, speakers, etc.) which are coupled to a network transceiver (e.g., a simplified DisplayPort transceiver, etc.). Often, nodes are highly optimized components implemented within a single piece of silicon; however, it is appreciated that discrete versions (e.g., composed of multiple chips) may be used with equivalent success consistent with the present disclosure. While the following discussion is presented primarily with reference to a network of nodes within a single consumer electronics device, it is appreciated that implementations vary widely, and may include external sensor assemblies, etc. as well as non-consumer electronic devices As used herein, the term "sink" refers without limitation to a node which consumes data/content, and the term "source" refers without limitation to a node which generates data/content. In one exemplary embodiment, the data or content is a stream of audio/visual data. The stream of audio/visual data may additionally be packetized. In other embodiments, the content is contiguous data. Common examples of content include, without limitation, picture data, video data, audio data, metadata (e.g., gyroscopic data, time stamps, etc.). Those of ordinary skill in the related arts will further appreciate that while the following descriptions are described in terms of temporal streams, the payload data may be generated e.g., asynchronously (no relation between the amount of data and time), synchronously (i.e., a fixed amount of data at a fixed time interval), isochronously (i.e., a guaranteed amount of data transferred no later than a specified time), etc.

As used herein, the term "master" refers without limitation to a node which has unidirectional control over one or more other "slave" devices of a network topology. Within the present context, the master sink node directs link training and/or initialization.

As used herein, the term "concentrator" refers without limitation to a node which aggregates multiple streams of content. In one embodiment, a concentrator may also be a source or a sink. Moreover, a given node or component may operate as both a source and a sink when appropriately configured (e.g., a source for one device, and a sink for another).

In one exemplary embodiment, the data or content is a stream of audio/visual data. The stream of audio/visual data may additionally be packetized. In other embodiments, the content is contiguous data. Common examples of content include, without limitation, picture data, video data, audio data, metadata (e.g., gyroscopic data, time stamps, etc.). Those of ordinary skill in the related arts will further appreciate that while the following descriptions are described in terms of temporal streams, the payload data may be generated e.g., asynchronously (no relation between the amount of data and time), synchronously (i.e., a fixed amount of data at a fixed time interval), isochronously (i.e., a guaranteed amount of data transferred no later than a specified time), etc.

One exemplary data format is described in commonly owned, and co-pending U.S. Provisional Patent Application Ser. No. 61/914,312 filed on Dec. 10, 2013 and entitled "APPARATUS AND METHODS FOR PACKING AND TRANSPORTING RAW DATA", incorporated herein by reference in its entirety. As described therein, a DisplayPort Multi-stream Transport Packet (MTP) is described which packs RAW format camera data.

In one exemplary embodiment, the master sink node performs network discovery as a part of the device manufacture process. In one such variant, during the manufacturing process of a consumer electronics device (e.g., the iPad and iPhone devices manufactured by the Assignee hereof), the master sink node may execute a one-time calibration process that discovers the network of source devices. For instance, an iPhone applications processor may discover a first camera assembly corresponding to the forward facing camera, and a second camera assembly corresponding to the rear facing camera.

In other embodiments, the master sink node performs network discovery each time the device is first powered on and/or wakes from sleep modes. In other embodiments, the master sink node performs network discovery when a network change is detected; e.g., based on a hot-plug detect signal corresponding to a node addition, removal, etc. In some cases, network changes can occur based on use case, or application software requirements. For example, a smartphone with multiple camera components may enable or disable components as necessary to e.g., save power, free up network resources (e.g., timeslots). When the user opens up the camera application (e.g., front facing camera) or switches between cameras (e.g., between a front facing camera and a rear facing camera), the master sink enables the appropriate camera components (and disables the unused components).

At step 104 of the method 100, the master sink node enables the one or more nodes for training tests and or link calibration. It is appreciated that some complex network implementations may have intermediary links (or "hops") between the sources and the master sink device; accordingly, the master sink node may be required to enable each "hop" of the network.

In one exemplary embodiment, the master sink node sets the bandwidth and enables the source nodes for testing. In some cases, the master sink node may be required to wait for acknowledgment and/or status reports from the source nodes and/or intermediary nodes. For example, some nodes may have internal clock circuitry which must stabilize (e.g., Phase Locked Loops (PLLs)). In some variants, the master sink node polls the individual nodes of the networks for status; in other variants, the nodes report status to the master sink node.

At step 106 of the method 100, the master sink node configures the one or more nodes and/or intermediary hops with appropriate parameters for training tests and/or link calibration. In some variants (e.g., for embedded applications with static device layouts, etc.), the master sink node may have one or more default parameters which can be used pre-calibration. These default values may be known ahead of time based on e.g., historical analysis, empirical measurement, simulation, etc.

In one exemplary embodiment, a DisplayPort master sink node programs established defaults for voltage swing and pre-emphasis settings of each source node. Other common examples of default settings may include e.g., clock rate, power configuration, wait cycles, transmitter/receiver gain, time shift, termination, impedance matching, scrambling, etc.

In one embodiment, the operational settings are fixed for the device. For example, in embedded applications, the device topology may be simple enough to where a single fixed setting is sufficient for the life of the device. Certain variants may additionally hardcode the receiver equalizer settings into the device.

At step 108 of the method 100, the master sink node performs or causes the performance of one or more link training tests for each hop of the network (described in subsequent detail hereinafter). In one embodiment, the link training test is triggered by the sink node responsive to e.g., power up, application requirements, as a result of bandwidth changes of other nodes, etc., or combinations of the foregoing. In other embodiments, a node of the network may request adjustment (e.g., via I2C bus, DisplayPort AUX channel, etc.), causing the master sink node to re-train/initialize the network.

As a brief aside, DisplayPort defines the required electrical properties at the following test points (typically verified via test equipment): (i) the source silicon package pins (TP1), (ii) the source device connector (TP2), (iii) the sink device connector (TP3), and (iv) the sink silicon package pins (TP4)). For example, the DisplayPort standard specifies that at an "anchor point" setting of [2,0], TP2 must present an eye mask that conforms to the DisplayPort standard. The remaining combinations are determined relative to the anchor point [2,0](or from combinations that were derived from the anchor point). For example, setting [1,0] is defined as being having a 2.5 dB lower voltage swing than setting [2,0].

Generally, DisplayPort calibration must ensure that the anchor point [2,0] meets the mask requirements. Once the anchor point is successfully calibrated, the actual voltage swing and pre-emphasis levels are measured at the anchor point. Thereafter, the "adjacent" settings are calibrated (e.g., [2,1], [1,0], and [3,0]) according to requirements measured relative to the anchor point. As used with respect to link settings, the term "adjacent" refers generally to a setting that does not differ by more than either one voltage swing level and/or one pre-emphasis level. In some cases adjacent settings are further limited such that voltage settings are always calibrated vertically with a pre-emphasis of 0, whereas pre-emphasis is calibrated horizontally from [n,0]. For example, from [2,0] the settings for [2,1], [1,0], and [3,0] can be calibrated. From [1,0], the settings [1,1] and [0,0] can be calibrated. From [1,2], the setting [1,2] can be calibrated. From [0,0] setting [0,1] can be calibrated, which is used to calibrate[0,2], which is used to calibrate[0,3]. The process is iteratively repeated until all 10 combinations are calibrated (i.e., [2,2], [1,1], [3,1] are adjacent to, and derived from [2,1]).

Additionally, the calibration may include receiver equalization configurations. As a brief aside, receiver equalization adjusts the balance between frequency components within an electronic signal by amplifying or attenuating the energy of specific frequencies. Specifically, a receive equalizer will compensate for the channel effects experienced by the transmitted signal. The transmitted signal can be accurately reproduced at the receiver by accentuating frequencies that were attenuated (and attenuating frequencies that were unintentionally amplified, or accidentally introduced). This configuration may already be in place before beginning the method as well.

Receiver equalization is one example of receiver compensation, other common examples of receiver compensation include without limitation, for example: automatic frequency control (AFC), automatic gain control (AGC), phase locked loops (PLL), delay locked loops (DLL), clock data recovery, variable attenuation and gain. More generally, the receive path must be initialized so as to accurately represent the impairments of the receive path during normal operation (e.g., during data traffic loads).

At step 110 of the method 100, responsive to completion of the link training test for each link, the master sink node enables operation of the link. In one embodiment, the master sink node configures the source of the link to send an idle pattern. In one such variant, the sink of the link is further enabled with an appropriate operational mode. Once all the links of the network have completed link training, the master sink node enables the network. In one embodiment, the master sink node instructs the source nodes to send A/V data (e.g., send video or audio data).

Clock Recovery Test—

In one exemplary embodiment, the link training tests include a clock recovery test. During a clock recovery test, the master sink node instructs the source to repeatedly transmit a repeating test pattern having clock-like content (e.g., a number of clock edges). In one case, the test pattern is selected to transition at a fixed rate, and is used to drive a feedback loop within the sink. In one variant, the source and sink are presumed to be synchronized and thus clock recovery failure indicates inappropriate signal integrity parameters. In such implementations, where the source and sink cannot achieve clock recovery within a reasonable time, the source adjusts one or more transmit settings (e.g., increasing its voltage swing, drive current, pre-emphasis, etc.) to improve signal integrity.

In another variant, when the test pattern transitions too frequently with respect to the sink (i.e., where the receiver clock is slower than the transmit clock), the sink increases its clock rate; conversely, where the sink observes a test pattern that transitions too slowly (i.e., where the receiver clock is faster than the transmit clock), the sink decreases its clock rate.

Once the sink has successfully locked to the source clock, the sink reports successful clock recovery to the master sink node (if the sink is the master sink node, the test may simply end). In some cases, the master sink node polls the sink node for clock recovery test status. In other cases, the sink node messages the master sink node.

Various other schemes for clock recovery are readily appreciated by those of ordinary skill in the related arts, given the contents of the present disclosure.

Symbol Lock Test—

In one embodiment, the link training tests include a symbol lock test. During a symbol lock test, the master sink node instructs the source to repeatedly transmit one or more test patterns having data-like content (e.g., a number of valid symbols). During the calibration process the transmitter transmits a test pattern to the receiver, and the receiver analyzes the received pattern for acceptable performance. If the receiver determines that the received pattern is acceptable, than the transmitter can adopt more aggressive settings (which will further diminish the signal quality, but improve e.g., link speed, power consumption, etc.). This process is repeated until the link no longer performs acceptably (or the settings for the transmitter cannot be further adjusted). In this manner, the transmitter and receiver determine the minimum receiver requirements (i.e., the most aggressive setting that performs acceptably).

Figure 2:
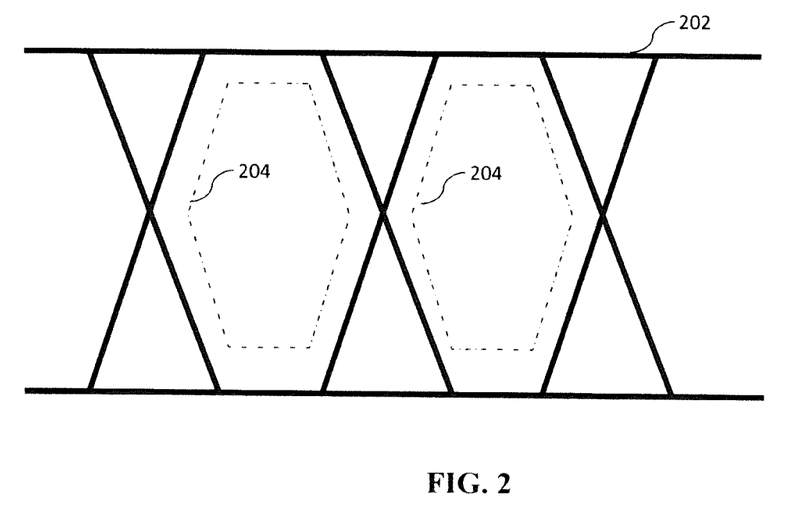
FIG. 2 illustrates an exemplary "eye diagram" as commonly used within the related arts.

As a brief aside, FIG. 2 illustrates an exemplary "eye diagram" used within the related arts. An eye diagram is a pattern 202 produced (e.g., on test equipment) when a digital signal on a transmission line is repetitively sampled by using logic level transition edges to trigger a horizontal sweep. Between transitions, the measured voltage can be at a discrete level (e.g., 0, 1). However, undesirable transmission line effects will "close" the eye. For example, clock jitter will randomly increase or decrease the amount of time between transition edges, which narrows the eye between transitions. Similarly, poorly matched line impedances will introduce signaling reflections, undershoots, and overshoots, which will muddy the distance between the discrete levels of the eye.

Eyes are typically further evaluated with the use of an "eye mask" 204. The eye mask indicates the degree of acceptable deviance from the eye before the receiver misinterprets the signaling. In other words, the eye mask represents the maximum system tolerance for channel effects. Thus, an eye that crosses into the eye mask will have an unacceptable error rate.

The symbol lock test ensures that the signal "eye-diagram" is acceptable for varying runs of logical highs and logical lows. For this reason, in some variants, the symbol lock test patterns are chosen for worst case runs (longest runs of consecutive zeros/ones, shortest runs of consecutive zeros/ones, etc.). During this phase, the source and sink are presumed to be synchronized; in fact, in some implementations, the symbol lock test is performed after a clock recovery test.

During the symbol lock test, the source transmits a test signal, and the sink evaluates the received signal. Problems in the link will manifest as a higher than expected Bit Error Rate (BER) (i.e., BER is a measure related to the difference between the transmitted test signal and the received test signal). If the BER is unacceptable, the source and sink adjust the setting. The process iterates until the source and sink have determined a setting that provides an acceptable BER.

Once the sink and the source have achieved symbol lock, the sink reports successful symbol lock to the master sink node (if the sink is the master sink node, the test may simply end). In some cases, the master sink node polls the sink node for symbol lock test status. In other cases, the sink node messages the master sink node.

Various other schemes for symbol lock are readily appreciated by those of ordinary skill in the related arts, given the contents of the present disclosure.

Interlane Alignment Test—

In one embodiment, the link training tests include an interlane alignment test. During this phase, the source and sink are presumed to have symbol lock; in fact, in some implementations, the interlane alignment test is performed after a symbol lock test. More directly, even though the source and the sink have optimized the BER for each lane, each lane may be slightly offset in time (e.g., bit 0 of lane 0 may arrive coincident to bit 2 of lane 1, etc.).

In one exemplary embodiment, the receiver includes a First-In-First-Out (FIFO) symbol buffer for each lane. During the interlane alignment test, a recognizable symbol is transmitted periodically on each of the lanes simultaneously; the symbol is used to achieve symbol lock by identifying where the symbol boundaries are.

As a brief aside, in 8B10B encoding, so called "K codes" or "control symbols" are readily distinguishable from other "D codes" or "data symbols". Several K codes have special properties; for example, the so called "comma symbols" (K.28.1, K.28.5, and K.28.1) are typically used for synchronization because of specific characteristics of the bit pattern (e.g., finding the alignment of the 8B10B codes within a bit-stream). For example, K.28.7 is the only comma symbol that cannot be the result of a single bit error in the data stream. Accordingly, in one exemplary implementation, the interlane alignment test includes receiving comma symbols (e.g., K.28.7) and then identifying the phase offset of each lane from the other lanes. Once the phase offsets are known, the individual FIFO buffers are calibrated so that the comma symbol is output from the FIFOs simultaneously according to a single common system clock (of the receiver). In one such example, the input to each FIFO is clocked by the recovered clock for the specific lane, whereas the output of the FIFOs is clocked by a common system clock. In some implementations, DisplayPort has a further level of sophistication, in that each lane is phase offset from the immediately lower numbered lane by two (2) 8B10B symbols (i.e., 20 bits). Thus, for example, the receive FIFO for lane zero typically inserts a delay of a nominal six (6) symbols, lane one has nominal four (4) symbol offset, lane two has two (2) symbols, and lane 3 has no phase offset.

More directly, the receiver analyzes the received pattern (e.g., the comma pattern) for each lane and determines the amount of time shift between the lanes (represented as a number of bits). Since the comma pattern varies as a function of time, the receiver can identify the corresponding symbol boundaries and bit offsets of each lane which correctly provide the comma symbols and their appropriate phase offset (if any). By adjusting a configurable delay for each lane, the receiver can independently align the lanes.

Once the sink and the source have achieved interlane alignment, the sink reports successful initialization of the link to the master sink node (if the sink is the master sink node, the test may simply end). In some cases, the master sink node polls the sink node for test completion status. In other cases, the sink node messages the master sink node.

Apparatus—

Figure 3:
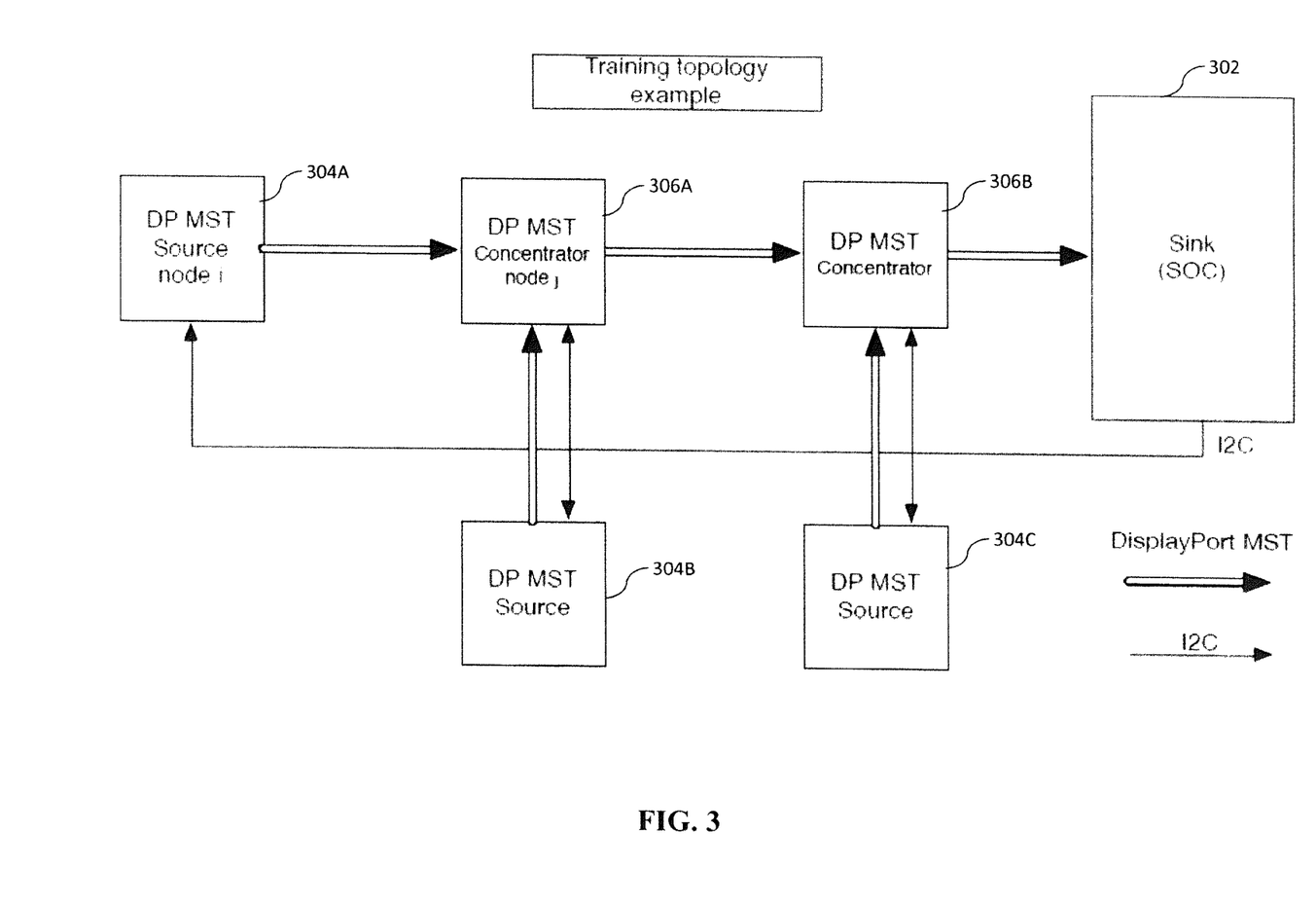
FIG. 3 is a logical block diagram of one exemplary embodiment of an apparatus, useful for illustrating link initialization, training and management of a unidirectional, sink-driven A/V interface, according to the disclosure.

FIG. 3 is a logical block diagram of one exemplary embodiment of an apparatus 300, useful for illustrating link initialization, training and management of a unidirectional, sink-driven A/V interface. As shown, the exemplary apparatus includes a network comprising a system-on-chip (SoC) processor 302 that is connected to a plurality of camera assemblies (304A, 304B, 304C) and concentrators (306A, 306B). The SoC processor 302 in this network is a master sink node which manages the link initialization for the plurality of sensors (304A, 304B, 304C) and concentrators (306A, 306B), via an I2C control bus (Slave Control (SCL), Slave Data (SDA)).

Various exemplary embodiments of component architectures are now described in greater detail. As described herein, the main video streams from components are based on the exemplary DisplayPort Multiple Stream Transport (MST) as outlined in the DisplayPort specification, Version 1.2 (published by the Video Electronics Standards Association (VESA) on Dec. 22, 2009), incorporated herein by reference in its entirety, although the present disclosure is in no way limited thereto.

However, unlike existing DisplayPort implementations which are managed by a source component, various of the disclosed embodiments described herein are managed by a sink component (or components).

Moreover, in some further simplified embodiments, the DisplayPort interface may replace the Auxiliary (AUX) channel, with an I2C type interface configured to set up and trigger dynamic bandwidth allocation changes. Traditionally, DisplayPort AUX channel is typically configured to set up MST operation, and incorporates procedures for topology discovery, bandwidth allocation, etc. Accordingly, in variants that do not include an AUX channel, topology discovery may be skipped or handled in device software or firmware (e.g., the topology is preprogrammed as part of the system design).

Figure 4:
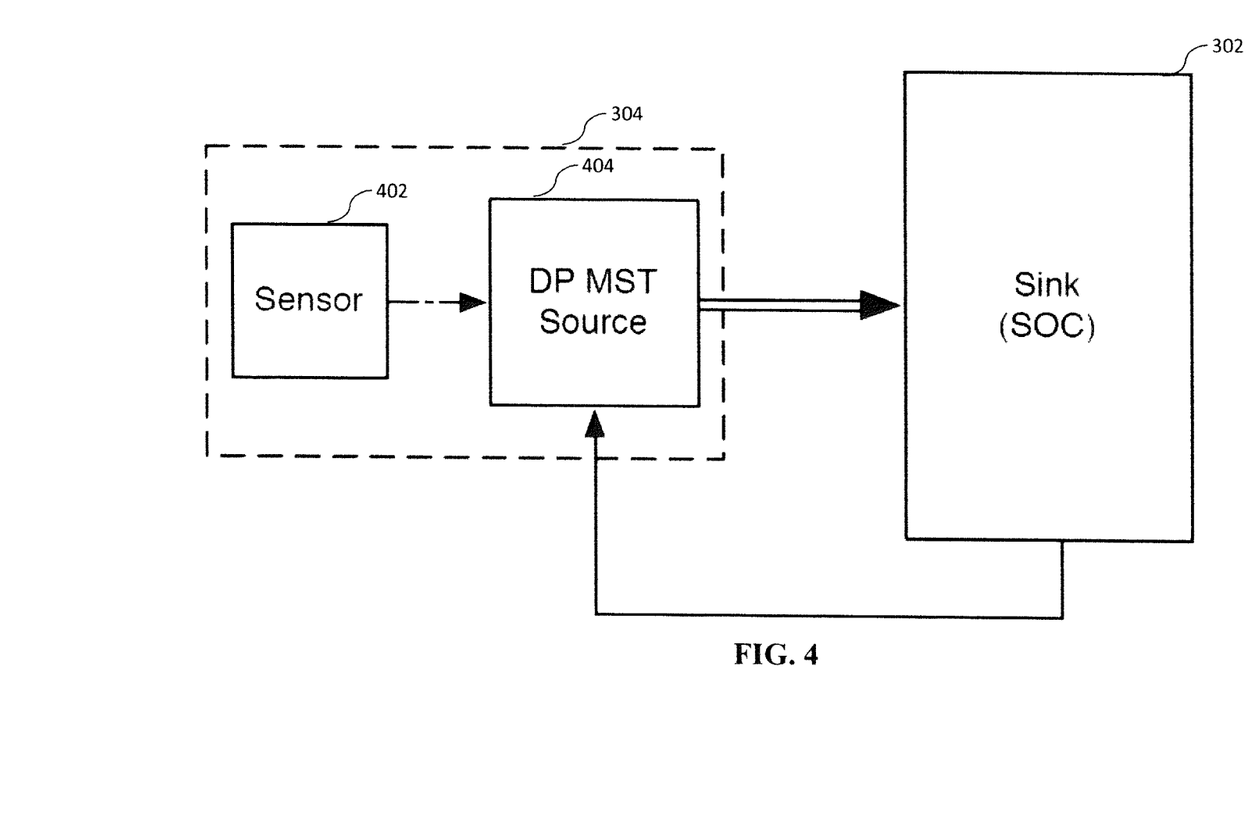
FIG. 4 is a logical block diagram of one exemplary embodiment of an exemplary camera assembly.

Referring now to FIG. 4, in one simplified embodiment, the camera sensor assembly 304 includes the physical camera sensor 402 and a simplified DisplayPort MST source 404. The simplified DisplayPort MST source is configured to pack sensor data into the DisplayPort protocol MST packets as a single virtual channel. In one variant, the camera sensor assembly 304 is contained within a single component (within the same silicon chip); in other implementations the camera sensor assembly 304 may be formed from various discrete components. The interface between the physical camera sensor 402 and simplified DisplayPort MST source 404 is typically an internal implementation dependent interface. In some cases, the interface is proprietary.

Referring back to FIG. 3, each node of the network can dynamically negotiate more or less bandwidth with the SoC 302 (although this may temporarily disrupt other streams while the network is updated). It is appreciated that fixed consumer devices (e.g., where the components not added or removed from the system), will not fine tune bandwidth requirements between components. However, dynamic adjustments can be used to further improve device operation by powering on or off unused sensors to e.g., save power when not in use. Moreover, it is appreciated that dynamic bandwidth adjustment also "future-proofs" devices, enabling hardware to continue to operate in scenarios which extend beyond those originally envisioned by the product designer.

More generally, it is readily appreciated that the node components of an A/V network may include an upstream plurality of ports and corresponding receiving elements (e.g., receiving interfaces, transceiver interfaces), a downstream plurality of ports and corresponding transmitting elements (e.g., transmitting interfaces, transceiver interfaces), and one or more digital processing elements. Additionally, each node may include memory elements (e.g., storage devices), and/or audio and/or video elements. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

It will be appreciated that not all elements are required in each node for operation within an apparatus. For instance, a source-only node would not require upstream ports, or certain audio or video elements. Conversely, a sink-only node may not require downstream ports.

Each source includes circuitry configured to pack data for transmission via one or more main lanes according to a transmitter mapping data structure e.g., a virtual channel (VC) payload table. The transmitter mapping data structure identifies for each stream of data, a corresponding resource for transmission. In one embodiment, each source node transmits data in a stream according to one or more corresponding timeslots identified by its virtual channel (VC) payload table. Each sink includes circuitry configured to unpack data received via one or more main lanes according to a receiver mapping data structure. The mapping data structure identifies which resources correspond to a stream of data. In one embodiment, each sink node unpacks timeslots into respective virtual channels according to a virtual channel (VC) payload table. In some embodiments, the same mapping data structure is used for both reception and transmission.

As used herein, the term "circuitry" refers without limitation to any type of component or device having any level of integration (including without limitation ULSI, VLSI, and LSI) and irrespective of process or base materials (including, without limitation Si, SiGe, CMOS and GaAs), as well as discrete components such as resistors, diodes, capacitors, inductive reactors, and any combinations of the foregoing.

In one exemplary embodiment, the network further includes a bi-directional I2C channel that carries information configured to negotiate changes to, and program, the virtual channel (VC) payload tables of each node. The main lanes are configured to transact packet-based unidirectional traffic, such as the DisplayPort protocol previously described herein. In some embodiments, a SoC master sink node 302 further controls the I2C bus. In other embodiments, programming is performed via an auxiliary (AUX) channel.

The SoC master sink node 302 processing subsystem is tightly coupled to operational memory, which may include for example SRAM, FLASH and SDRAM components. The processing subsystem may also comprise additional co-processors, such as a dedicated graphics accelerator, network processor (NP), or audio/video processor.

The SoC master sink node 302 is adapted to receive one or more media streams from the array of sensor assemblies 304 for processing for media displays such as a video display, or audio speakers. As used herein, the term "display" refers without limitation to any visual display device including e.g., LCD, plasma, TFT, CRT, LED, incandescent, fluorescent, and other types of indicator or image display technologies. SoC master sink node 302 may preferentially comprise graphics processors, applications processors, and or audio processors.

Example Operation

Figure 5:
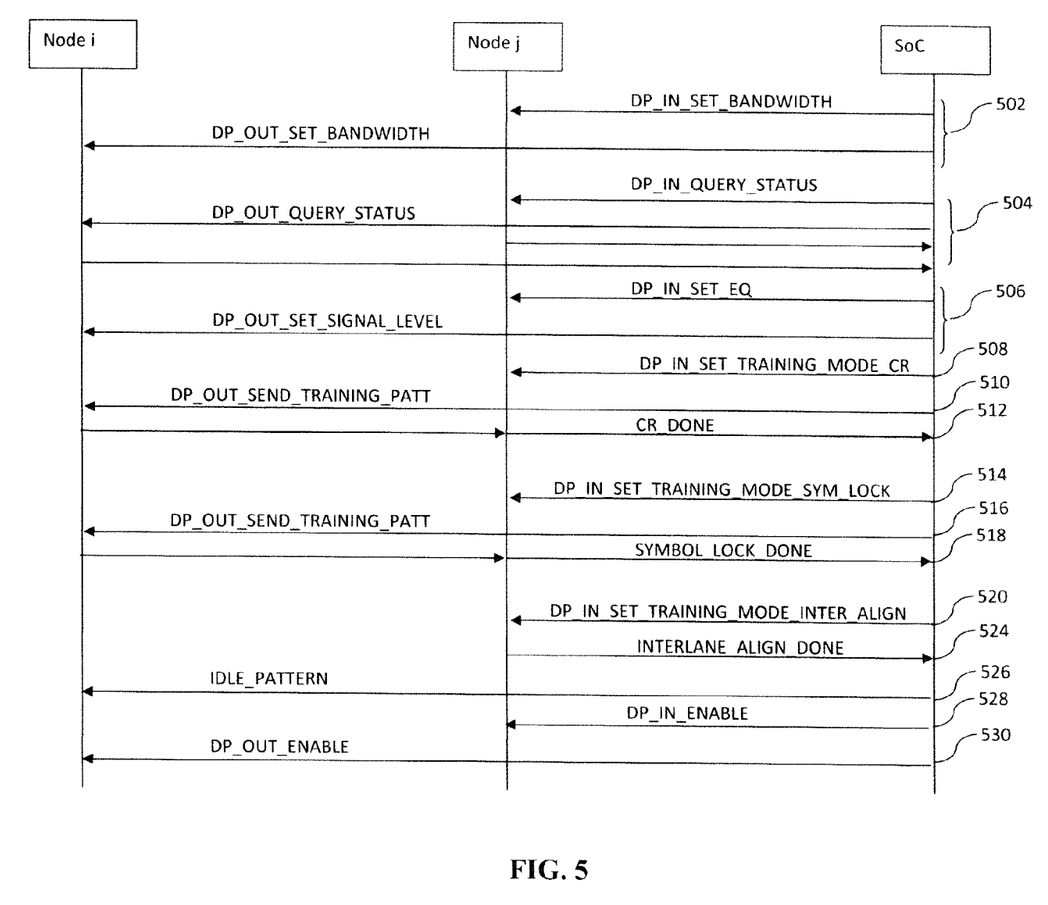
FIG. 5 is a flow diagram of one exemplary implementation of link training as implemented within the exemplary system of FIG. 3.

FIG. 5 is a flow diagram of one exemplary implementation of link training as implemented within the exemplary system of FIG. 3, between nodes 304A (camera assembly, node i) and node 306A (concentrator, node j).

While the following flow is provided via two nodes of the network, it is appreciated that each hop of the network is trained in likewise fashion, the following being merely illustrative. In one exemplary embodiment, each hop of the network is trained remotely, under control of the master sink node (the eventual receiver of the video streams). In one preferable variant, the training proceeds from the far ends of the network (e.g., the source nodes), and converges to the center. This ensures that there is valid video data available for transmission as soon as training completes. In alternate embodiments, the training may start at the center of the network (e.g., from the master sink node) and progress outwards or in some cases. Such embodiments may be useful for robust operation; for example, if an intermediary link is marginal, the branches from the intermediary link can be disabled. Those of ordinary skill in the related arts, given the contents of the present disclosure, will readily appreciate that other embodiments may begin training at an intermediary node, or some combination of the foregoing.

Within the context of FIG. 5, the SoC 302 issues commands via an I2C bus to each node. The source commands include, without limitation: DP_OUT_SET_BANDWIDTH, DP_OUT_DISABLE, DP_OUT_ENABLE, DP_OUT_QUERY_STATUS, DP_OUT_SET_SIGNAL_LEVEL, DP_OUT_SEND_TRAINING_PATTERN, DP_OUT_SEND_IDLE_PATTERN, and DP_OUT_SEND_NORMAL_VIDEO.

The sink commands include, without limitation: DP Ind. SET_BANDWIDTH, DP_IN_DISABLE, DP_IN_ENABLE, DP_IN_QUERY_STATUS, DP_INSET_TRAINING_MODE (CR/SYMBOL_LOCK/INTERLANE_ALIGN), DP_IN_QUERY_RX_STATUS (CR_DONE, SYMBOL_LOCK_DONE, INTERLANE_ALIGN_DONE), DP_IN_SET_EQ, DP_IN_QUERY_EYE_QUALITY_ MONITOR, DP_IN_SET OPERATIONAL MODE, and DP_IN_QUERY_SYMBOL_ERROR_COUNT.

At step 502 of the method 500, the SoC 302 sends commands to nodes i and j (304A, 306A) to set the bandwidth and enable the links. The internal PLLs for the nodes will take some time to spin up and stabilize.

At step 504, the SoC 302 queries the statuses of both ports until they report that they are both ready.

At step 506, the SoC 302 sends commands to node i 304A to set the default swing and pre-emphasis level, and to node j 306A to set the default receiver equalizer setting.

At step 510, the SoC 302 sends a command to node i 304A to output TPS1 (clock recovery pattern). At step 508, the SoC 302 sends a command to node j 306A to set training mode CR (clock recovery). At step 512, the SoC 302 queries node j 306A until node j 306A reports CR_DONE (this may require multiple iterative attempts between node i and node j).

At step 516, the SoC 302 sends a command to node i 304A to output TPS2/3/4 (EQ) pattern for symbol lock testing. At step 514, the SoC sends a command to node j 306A to set training mode SYMBOL_LOCK. At step 518, the SoC 302 queries node j 306A until it reports SYMBOL_LOCK_DONE. In the exemplary embodiment, the SoC 302 provides the appropriate adjustments for the RX EQ and the TX swing/pre-emphasis levels to ensure that the received signal has adequate margin, as verified by querying the eye monitor. If SYMBOL_LOCK_DONE is not achieved within a reasonable period of time, then the SoC 302 adjusts the RX EQ and TX swing/pre-emphasis with new settings until an optimal setting is found.

At step 520, the SoC 302 sends a command to node j 306A to set training mode INTERLANE_ALIGN. At step 524, the SoC 302 queries node j 306A until it reports INTERLANE_ALIGN_DONE.

Thereafter, at step 526, the SoC 302 sends a command to node i 304A to send IDLE_PATTERN; at step 528, the SoC 302 sends a command to node j 306A to enable the operational mode.

Once the rest of the network has been trained, the SoC sends a command to node i 304A to send normal video (step 530).

It will be recognized that while certain embodiments of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the embodiments disclosed and claimed herein.

While the above detailed description has shown, described, and pointed out novel features applicable to various embodiments, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for link initialization of a unidirectional interface of an electronic device performed by a master sink node, comprising:
   discovering one or more other nodes of a network, the one or more other nodes comprising a source node and a concentrator node, the concentrator node being configured to aggregate data streams from multiple source nodes to the master sink node;
   setting first bandwidth requirements for the source node;
   setting second bandwidth requirements for the concentrator node;
   configuring the source node for link initialization by identifying a test pattern to transmit;
   configuring the concentrator node for link initialization by identifying the test pattern to receive;
   causing the source and concentrator nodes to perform a test characterized by the test pattern; and
   querying the concentrator node for a status of the test.

2. The method of claim 1, further comprising instructing the source node to generate video content.

3. The method of claim 1, further comprising enabling the network when each one of the one or more other nodes have successfully completed the test.

4. The method of claim 1, wherein the test comprises a clock recovery test and the method further comprises instructing the source node to repeatedly transmit a repeating test pattern having clock-like content.

5. The method of claim 4, further comprising receiving a report of successful clock recovery.

6. The method of claim 4, wherein the querying of the concentrator node for the status of the test comprises polling the concentrator node for the status of the clock recovery test.

7. The method of claim 1, wherein the causing the source and concentrator nodes to perform the test further comprises instructing the source node to repeatedly transmit one or more test patterns having data-like content.

8. The method of claim 7, further comprising receiving a report of successful symbol lock.

9. The method of claim 7, further comprising causing the execution of an interlane alignment test, the interlane alignment test being performed subsequent to the test.

10. A master sink node configured to perform link initialization of a unidirectional interface of an electronic device, comprising:
    a processing apparatus configured to discover one or more other nodes of a network, the one or more other nodes comprising a source node and a concentrator node, the concentrator node being configured to aggregate data streams from multiple source nodes to the master sink node;
    the processing apparatus further configured to identify a test pattern to be performed by the source node and the concentrator node;
    the processing apparatus further configured to cause the source node and the concentrator node to perform a test characterized by the test pattern; and
    the master sink node is further configured to receive a status of the test.

11. The master sink node of claim 10, wherein the master sink node is further configured to instruct the source node to generate video content.

12. The master sink node of claim 11, wherein the master sink node is further configured to enable the network when the source node and the concentrator node have successfully completed the test.

13. The master sink node of claim 12, wherein the master sink node is further configured to enable the network when each of the one or more other nodes of the network have successfully completed the test.

14. The master sink node of claim 10, wherein the test comprises a clock recovery test and the master sink node is further configured to instruct the source node to repeatedly transmit a repeating test pattern having clock-like content.

15. The master sink node of claim 14, wherein the status of the test further comprises a report of successful clock recovery.

16. The master sink node of claim 14, wherein the status of the test is received in response to a query issued by the master sink node.

17. The master sink node of claim 10, wherein the test comprises a symbol lock test, the symbol lock test characterized by the repeated transmission of data-like content.

18. The master sink node of claim 17, wherein the status of the test comprises a report of successful clock recovery.

19. The master sink node of claim 18, wherein the master sink node is further configured to cause the execution of an interlane alignment test, the interlane alignment test being performed subsequent to the test.

20. A non-transitory computer-readable storage apparatus comprising a plurality of instructions that are configured to, when executed by a processor, cause a master sink node of an electronic device to:
    discover one or more other nodes of a network, the one or more other nodes comprising a source node and a concentrator node, the concentrator node being configured to aggregate data streams from multiple source nodes;
set a first bandwidth requirement for the source node;
set a second bandwidth requirement for the concentrator node;
configure the source node for link initialization through the identification of a test pattern;
configure the concentrator node for link initialization through the identification of the test pattern;
cause the source and concentrator nodes to perform a test characterized by the test pattern; and
receive a status of the test.

* * * * *